United States Patent [19]
Ball et al.

[11] Patent Number: 6,151,157
[45] Date of Patent: *Nov. 21, 2000

[54] DYNAMIC OPTICAL AMPLIFIER

[75] Inventors: Gary A. Ball, Simsbury; Paul Sanders, Madison, both of Conn.

[73] Assignee: Uniphase Telecommunications Products, Inc., Bloomfield, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/884,747

[22] Filed: Jun. 30, 1997

[51] Int. Cl.$^7$ ...................................................... H01S 3/00
[52] U.S. Cl. ........................... 359/341; 359/134; 359/160
[58] Field of Search ................................. 359/179, 160, 359/161, 341, 124, 134; 385/37

[56] References Cited

U.S. PATENT DOCUMENTS

| | | |
|---|---|---|
| 4,284,663 | 8/1981 | Carruthers et al. . |
| 4,474,427 | 10/1984 | Hill et al. . |

(List continued on next page.)

FOREIGN PATENT DOCUMENTS

| | | |
|---|---|---|
| 0 695 050 A1 | 3/1996 | European Pat. Off. . |
| 0 762 569 A2 | 3/1997 | European Pat. Off. . |
| 0 762 691 A2 | 3/1997 | European Pat. Off. . |
| 0 766 423 A2 | 4/1997 | European Pat. Off. . |
| 2 295 247 | 11/1996 | United Kingdom . |
| WO 97/10658 | 3/1997 | WIPO . |

OTHER PUBLICATIONS

Shehadeh et al, OFC '95 Technical Digest, TuH2, 1995, p. 29.

Huang et al, CLEO'96, pp. 3–4, CMA4.

Imai et al, Japanese Journal of Applied Physics, Part 2, (Letters), vol. 35, No. 10A, pp. L1275–L1277, Oct. 1, 1996.

Su et al, IEEE Photonics Technology Letters, vol. 4, No. 3, Mar. 1992, pp. 269–271.

"Photoinduced Bragg Gratings In Optical Fibers" by William W. Mopey, Gary A. Ball and Gerald Meltz, Optics & Photonics News, Feb. 1994, 7 sheets.

Catalog of Integrated Optical Circuits, Uniphase Telecommunications Products, Electro–Optics Products Division, 1997.

"Piriodical" A Publication Of Photonic Integration Research, Inc., No. 12, Feb. 1997.

Literature regarding "Piri", Photonic Integration Research, Inc.

Literature regarding "AOTFS route traffic in WDM networks", Lightwave, Jun. 1996.

"Experimental Demonstration of Dynamic High Speed Equalization of Three WDM Channels Using Acoustoopitic Modulators and A Wavelength Demultiplexer" by Jin–Xing Cai et al., *IEEE Photonics Technology Letters*, vol. 9, No.5, May. 1997.

*Primary Examiner*—Mark Hellner
*Attorney, Agent, or Firm*—McCormick, Paulding & Huber LLP

[57] ABSTRACT

An optical amplifier for amplifying a plurality of signal components of a multi-wavelength optical beam passing through an optical fiber includes a portion of the optical fiber doped with a rare earth ion to amplify the optical signal wherein the gain spectrum as a function of the wavelength is nonuniform. The optical amplifier further includes a gain flattening module to compensate for the nonuniform gain spectrum of the doped fiber by attenuating each of the channels of the amplified signal to equalize the gain. A gain equalization module compensates for varying gain fluctuations due to the adding and subtracting of signal components. The gain equalization module adjusts dynamically each signal component of the optical beam such that the amplitudes of the signal components are substantially equal, in response to a plurality of control signals. Each control signal is representative of the degree of attenuation required to equalize the signal components. The respective control signals are generated by a loop status monitor that includes a waveguide for demultiplexing the optical beam, and a detector array that determines the amplitude of each signal component. A controller generates the control signals in dependence of the amplitude of the signal components.

17 Claims, 7 Drawing Sheets

U.S. PATENT DOCUMENTS

| | | | |
|---|---|---|---|
| 4,953,939 | 9/1990 | Epworth et al. . | |
| 4,984,861 | 1/1991 | Suchoski, Jr. et al. . | |
| 5,026,137 | 6/1991 | Tokumitsu . | |
| 5,042,898 | 8/1991 | Morey et al. . | |
| 5,077,816 | 12/1991 | Glomb et al. . | |
| 5,107,360 | 4/1992 | Huber . | |
| 5,115,338 | 5/1992 | DiGiovanni et al. . | |
| 5,119,447 | 6/1992 | Trisno . | |
| 5,134,620 | 7/1992 | Huber . | |
| 5,140,456 | 8/1992 | Huber . | |
| 5,148,503 | 9/1992 | Skeie . | |
| 5,151,908 | 9/1992 | Huber . | |
| 5,153,762 | 10/1992 | Huber . | |
| 5,159,601 | 10/1992 | Huber . | |
| 5,166,821 | 11/1992 | Huber . | |
| 5,168,534 | 12/1992 | McBrien et al. . | |
| 5,187,760 | 2/1993 | Huber . | |
| 5,191,586 | 3/1993 | Huber . | |
| 5,200,964 | 4/1993 | Huber . | |
| 5,208,819 | 5/1993 | Huber . | |
| 5,210,631 | 5/1993 | Huber et al. . | |
| 5,210,633 | 5/1993 | Trisno . | |
| 5,222,089 | 6/1993 | Huber . | |
| 5,231,529 | 7/1993 | Kaede . | |
| 5,243,609 | 9/1993 | Huber . | |
| 5,257,124 | 10/1993 | Glaab et al. . | |
| 5,257,125 | 10/1993 | Maeda . | |
| 5,260,823 | 11/1993 | Payne et al. . | |
| 5,268,910 | 12/1993 | Huber . | |
| 5,271,024 | 12/1993 | Huber . | |
| 5,283,686 | 2/1994 | Huber . | |
| 5,404,413 | 4/1995 | Delavaux et al. | 385/15 |
| 5,430,817 | 7/1995 | Vengsarkar | 385/37 |
| 5,436,760 | 7/1995 | Nakabayashi | 359/341 |
| 5,504,609 | 4/1996 | Alexander et al. . | |
| 5,541,766 | 7/1996 | Mizrahi et al. | 359/337 |
| 5,557,442 | 9/1996 | Huber | 359/179 |
| 5,579,143 | 11/1996 | Huber . | |
| 5,583,689 | 12/1996 | Cassidy et al. | 341/359 |
| 5,608,825 | 3/1997 | Ip . | |
| 5,623,565 | 4/1997 | Blair et al. | 126/359 |
| 5,627,848 | 5/1997 | Fermann et al. . | |
| 5,633,748 | 5/1997 | Perez et al. . | |
| 5,636,054 | 6/1997 | Artigaud et al. | 341/359 |
| 5,636,301 | 6/1997 | O'Sullivan et al. . | |
| 5,638,473 | 6/1997 | Byron . | |
| 5,691,999 | 11/1997 | Ball et al. | 6/372 |
| 5,696,615 | 12/1997 | Alexander | 130/359 |
| 5,701,194 | 12/1997 | Meli et al. | 359/341 |
| 5,745,283 | 4/1998 | Inagaki et al. | 359/341 |

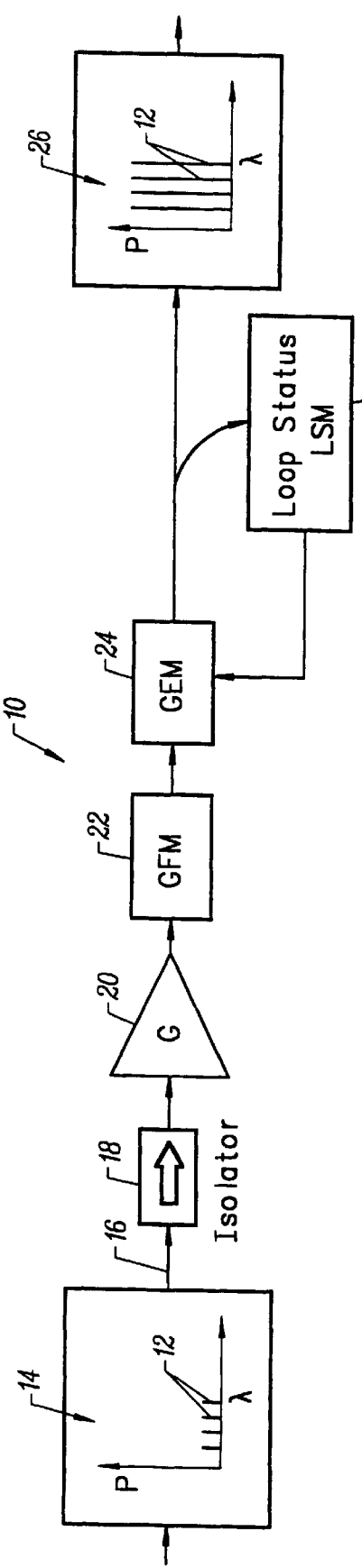
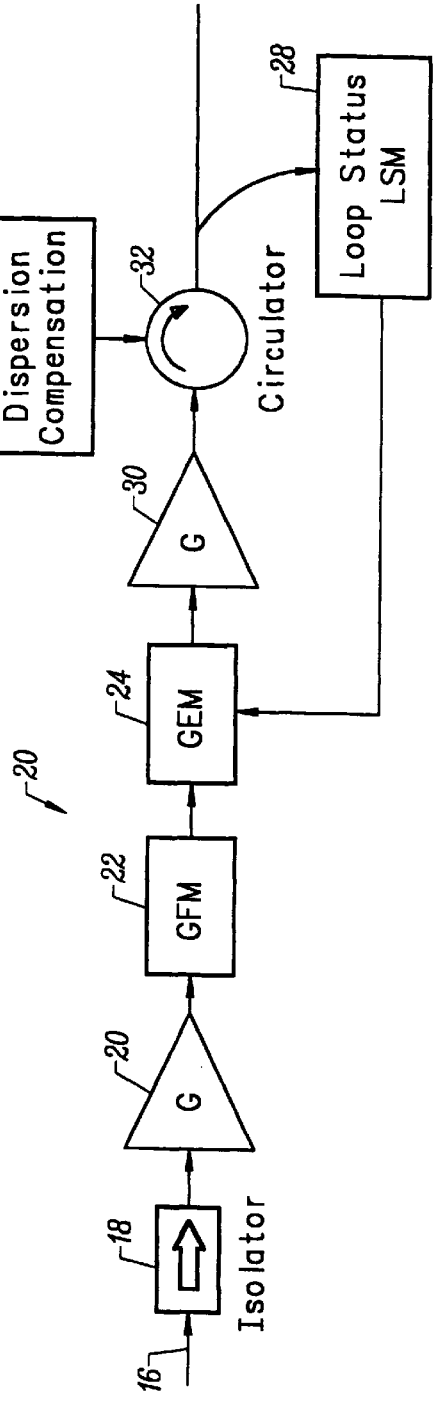
FIG. 2
FIG. 3

DYNAMIC OPTICAL AMPLIFIER

FIELD OF THE INVENTION

This invention relates to an optical amplifier, and more particularly to a dynamic optical amplifier for compensating for fixed and dynamic gain variations to amplify each signal component of a multi-wavelength optical beam such that the amplitude of each signal component is substantially equal.

CROSS REFERENCE TO RELATED APPLICATIONS

Some of the matter contained herein is disclosed and claimed in the commonly owned U.S. patent application Ser. No. 08/934,189, entitled "Process For Fabrication And Independent Tuning Of Multiple Integrated Optical Directional Couplers On A Single Substrate" pending in (Attorney Docket No. 4827-09); U.S. patent application Ser. No. 08/885,449, pending entitled "Method and Apparatus For Dynamically Equalizing Gain In An Optical Network" (Attorney Docket No. 4827-11) and U.S. patent application Ser. No. 08/885,427, pending entitled "Loop Status Monitor For Determining The Amplitude Of The Signal Components Of A Multi-Wavelength Optical Beam" (Attorney Docket No. 4827-13) all of which are incorporated herein by reference.

BACKGROUND OF THE INVENTION

Wavelength division multiplexing (WDM) of optical beams is presently being used to increase the rate of transmission of information through an optical fiber. These multi-wavelength optical beams provide information by a plurality of signal components, also referred to as optical channels. Each channel is defined by a unique wavelength of light that are multiplexed together and transmitted through a communication link of an optical network. To date, the industry has provided WDM of only eight channels, however, the channels are broadly spaced and not well defined.

Currently, wavelength division multiplexed (WDM) intercity communications links, as shown in FIG. 1, require a number of amplifiers along the link length to compensate for fiber loss. As the intercity links can run approximately 600 meters, there is currently a need for an amplifier every 80 to 120 kilometers in these links. With ever expanding telecommunication networks, network configurations and number of WDM channels, these amplifiers will need to provide low-noise, uniform-gain to each channel over a wide range of operating conditions (such as during the addition and subtraction of channels).

Each of the optical gain amplifiers are composed of an optical fiber doped with a rare earth ion, such as erbium or praseodymium. The gain as a function of color, or gain spectrum, of these amplifiers are not uniform over the range of wavelengths of the channels. The nonuniform gain characteristic of the doped optical fiber is compounded each time the optical beam is amplified along the communication link. Another phenomenon of gain tilt occurs especially for dynamically changing and/or reconfigurable dense wavelength division multiplexed communication links, wherein a multi-wavelength optical beam has as many as 40 tightly spaced channels. The effect of gain tilt is a function of the input power and wavelength of each transmitted channel. When a channel is added or subtracted, and thus changes the input power and spectrum of the optical beam, a gain fluctuation occurs in dependence on the channels' wavelength to effectively "tilt" the gain of the amplifier.

FIG. 1 shows a graphical representation of a typical communication link 2 of an optical network. A plurality of light generators (LG) 3 provide respective component signals 12 of select wavelengths that are combined by a multiplexer 4 to produce the multi-wavelength optical beam 14. Before the component signals are multiplexed, a plurality of pre-emphasis devices (PE) 5 attenuate selectively each of the respective component signals 12. As mention hereinbefore, a plurality of amplifiers 20 amplify the optical beam 14 to compensate for fiber loss as the beam passes therethrough. At the receiver end of the communication link, the signal components 12 of the optical beam are then separated by a demultiplexer 6 and provided to a corresponding receiver (R) 7.

The prior art 2 does not provide any compensation other than pre-emphasis to overcome the nonuniform gain of the each amplifier 20. As shown in each of the plots 14, which are representative of the amplitude of the output power of each channel 12, the differential of the output power of each of the channels increase after each gain stage 20. The output power and signal-to-noise ratio of each channel of the communication link at 8, therefore, are not equal. The only compensation provided by the prior art is adjustment of the pre-emphasis devices 5 for amplifying each channel 12 a predetermined amount to ensure that the output power of each channel are of acceptable power and signal-to-noise ratio.

Accordingly, it is the principal object of this invention to provide an optical amplifier that equally amplifies each channel of a dense wavelength division multiplexed optical beam.

It is another object of this invention to provide an optical amplifier that compensates for the non-uniform gain spectrum of doped fiber gain amplifier.

It is a further object of this invention to provide an optical amplifier that compensates for dynamic fluctuations and variation resulting from the adding and subtracting of channels.

It is yet another function of this invention to provide a dynamic amplifier that requires no calibration which permits the amplifier to be interchangeable throughout the optical network.

SUMMARY OF THE INVENTION

According to a preferred embodiment of the present invention, an optical amplifier amplifies substantially equally a plurality of component signals of a multi-wavelength optical beam transiting an optical network. Each component signal has an amplitude and a unique wavelength. The amplifier includes amplifying means for generating amplified component signals. The amplitude of each amplified component signal is respectively increased by a selected value. The amplifier further includes equalization means for generating, in response to control signals, equalized component signals from the amplified component signals. The equalized component signals have respective amplitudes which are adjusted to remove any relative amplitude difference therebetween due to variations in the amplitudes of the component signals of the multi-wavelength optical beam.

According to another embodiment of the present invention, a method for amplifying substantially equally a plurality of component signals of a multi-wavelength optical beam transiting an optical network, in which each component signal has an amplitude and a unique wavelength, includes a step of first amplifying the amplitude of each component signal by a respective amount. The amplitude of each amplified component signal is then adjusted, in response to control signals, to compensate for the varying, nonuniform gain of the amplifying means such that any relative amplitude difference therebetween due to variations in the amplitudes of said component signals of the multi-wavelength optical beam are removed.

The above and other objects and advantages of this invention will become more readily apparent when the following description is read in conjunction with the accompanying drawings.

BRIEF DESCRIPTION OF THE DRAWINGS

FIG. 2 is a diagrammatic block diagram of an optical amplifier of the type embodying the present invention.

FIG. 3 is a diagrammatic block diagram of an alternative embodiment of an optical amplifier of the type embodying the present invention.

DETAILED DESCRIPTION OF THE PREFERRED EMBODIMENT

Figure 1:
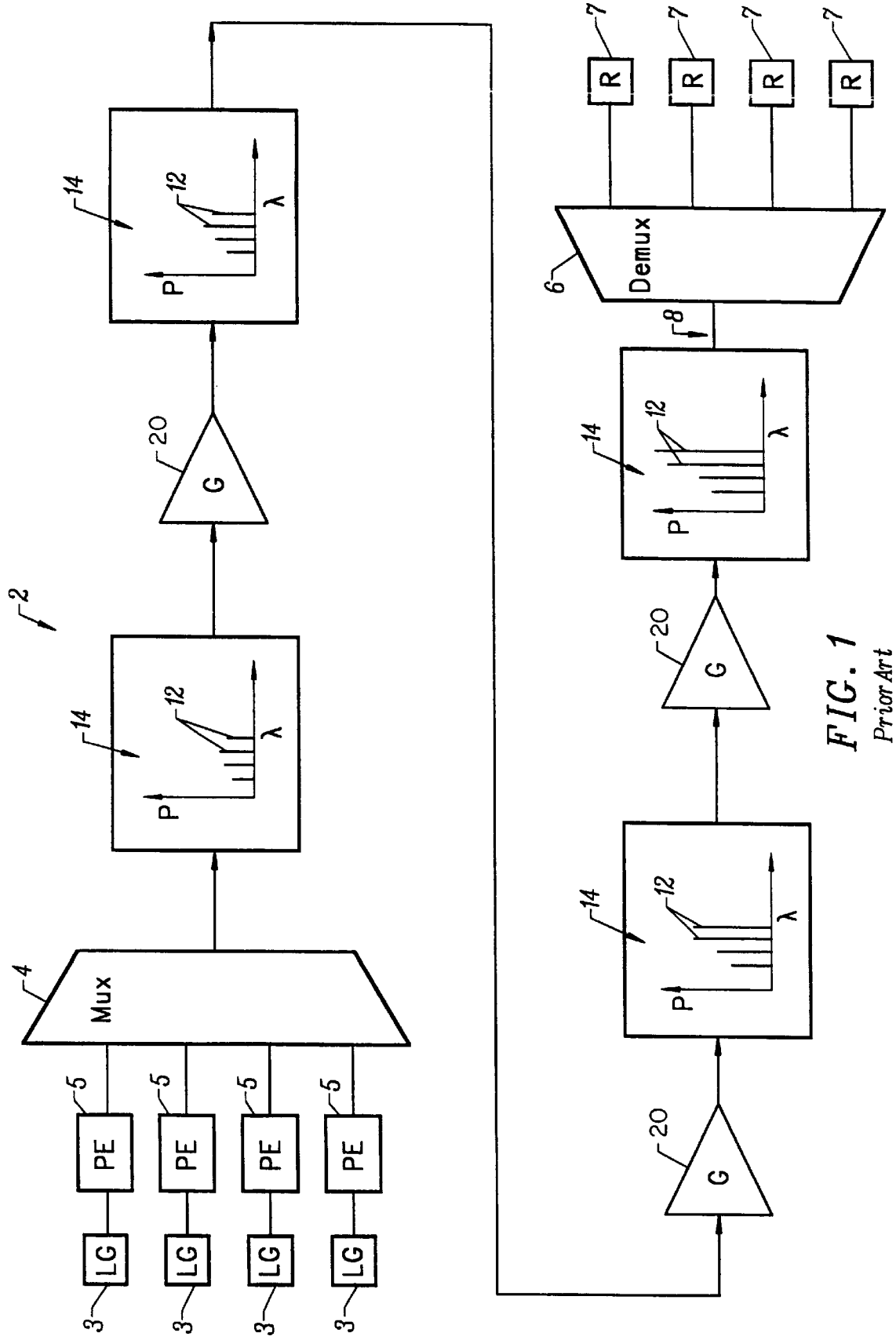
FIG. 1 is a graphical representation of a prior art communication link of an optical network.

Referring to FIG. 2, a block diagram of a preferred embodiment of a high performance optical amplifier with the required sophistication to handle reconfigurable networks is generally designated as 10. The amplifier provides a substantially uniform gain between each of the channels 12 of a dense wavelength division multiplexed optical beam 14 propagating through an optical fiber 16 of an optical network. The amplifier 10 includes an optical isolator 18 that permits the optical beam to pass through and prevent optical noise from propagating back through the optical fiber. The optical amplifier further includes a gain stage (G) 20, a gain flattening module (GFM) 22 and a gain equalization module (GEM) 24 connected in series. The optical beam is amplified initially by the gain stage 20, wherein the gain of each wavelength is not uniform. The amplified signal then passes through the gain flattening module 22 and the gain equalization module 24. The gain flattening module selectively attenuate each of the channels 12 to compensate for the fixed nonuniform gain characteristics of the gain stage 20 which will be described in greater detail hereinafter. The gain equalization module attenuates dynamically each of the channels in response to control signals provided by a loop status monitor (LSM) 28 to equalize the amplitude of each of the channels. The loop status monitor 28 determines the amplitude of each channel and generates the corresponding control signals provided to the gain equalization module. Each of the control signals are representative of the degree of attenuation required to equalize the output signal of the amplifier.

In another preferred embodiment shown in FIG. 3, the optical amplifier 20 may also include a second gain stage (G) 30 disposed in series after the gain equalization module 24, and/or a circulator 32 and dispersion compensator 34 disposed in series before the loop status monitor 28.

Figure 4:
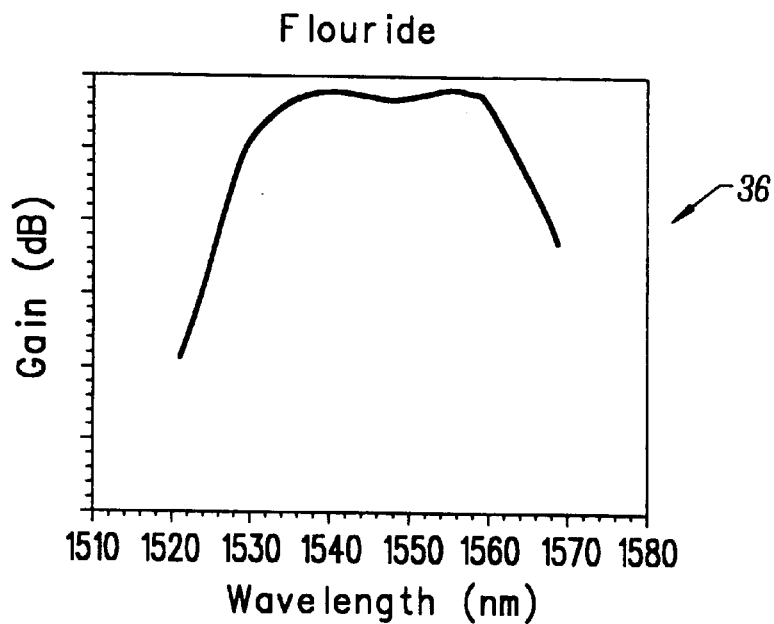
FIG. 4 is a graphical representation of the gain of an optical signal as a function of frequency for an erbium doped fluoride host glass.
Figure 5:
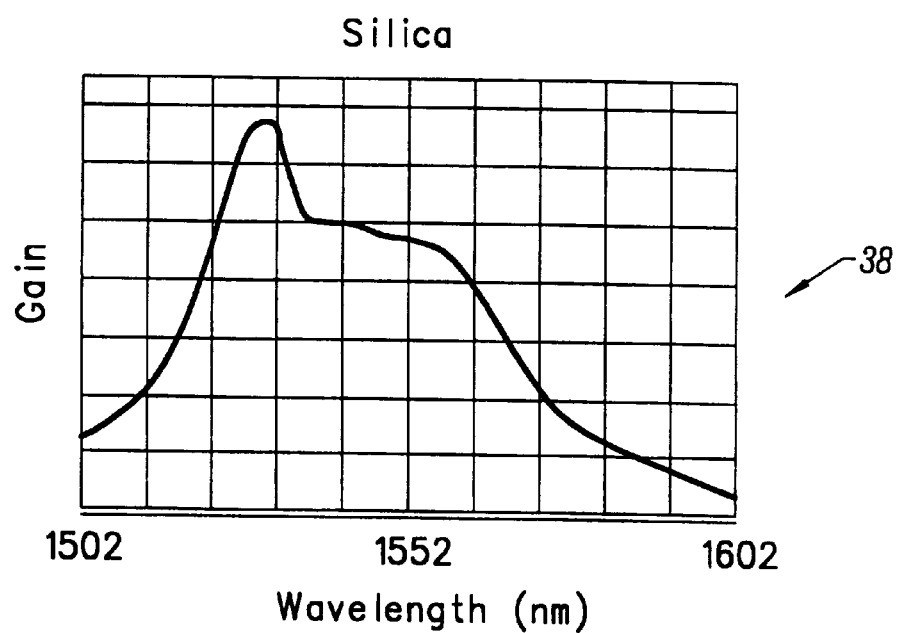
FIG. 5 is a graphical representation of the gain of an optical signal as a function of frequency for an erbium doped silica host glass fiber.

Each of the gain stages 20,30 include an optical fiber doped with a rare earth ion, such as erbium and praseodymium. The gain spectrum of these doped optical fibers is not uniform, and is also dependent on the input power, the spectrum of the optical beam and the composition of the fiber. In the case of erbium which provides a gain in the 1500 nm–1650 nm communications window, as shown in FIGS. 4 and 5, the gain can vary from 3 to 10 dB depending upon the glass composition of the fiber. FIG. 4 shows a plot 36 of the gain spectrum of an optical signal passing through an erbium doped fluoride host glass fiber. FIG. 5 shows a plot 38 of the gain spectrum of an optical signal passing through an erbium doped silica host glass fiber. In comparing the two gain spectra, a fluoride host glass fiber is preferable because the gain across the desired spectrum is more uniform, having less gain variation between the channels, and therefore requires less compensation, but has mechanical and hydroscopic properties which make it undesirable to work with.

Figure 6:
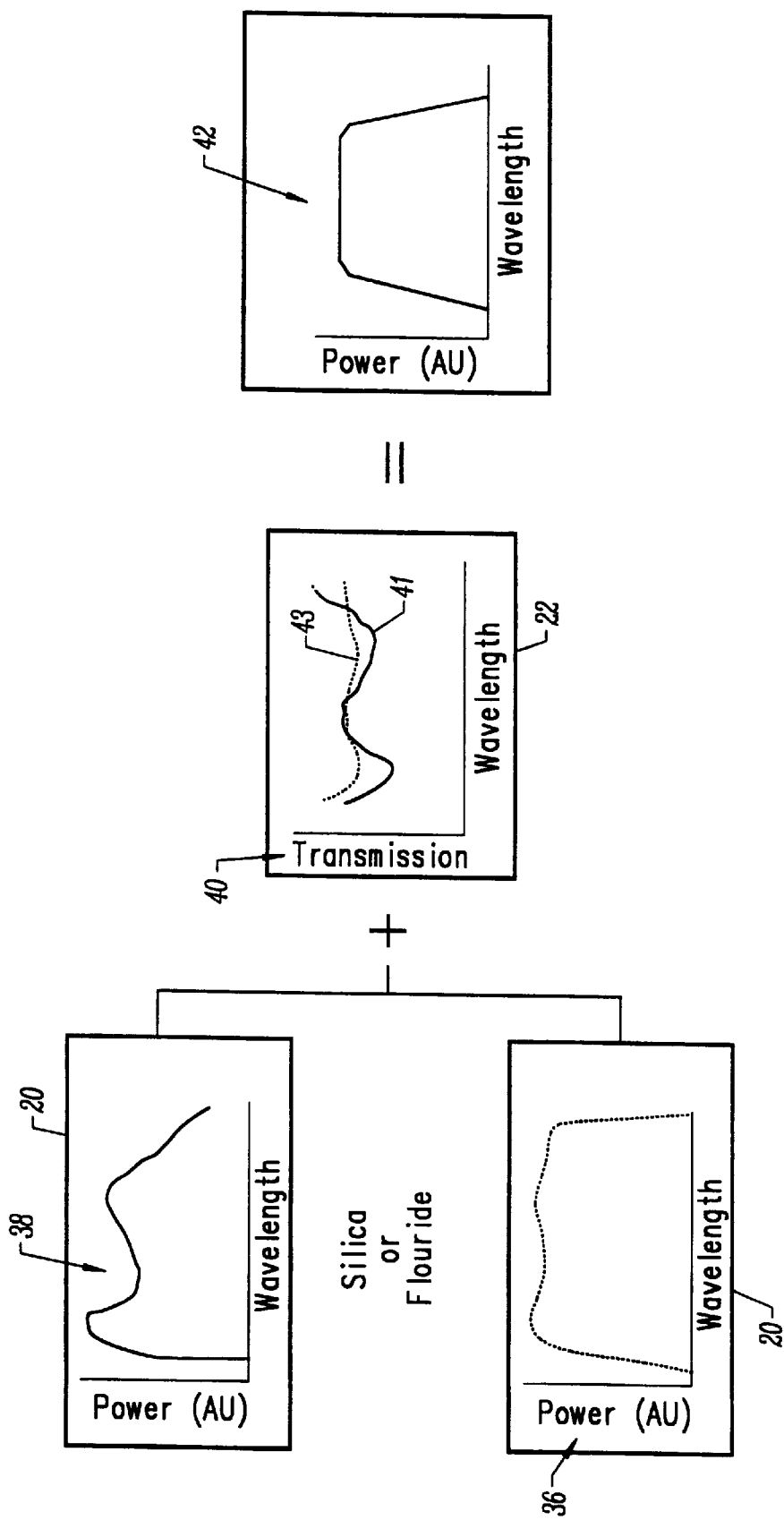
FIG. 6 is a graphical representation of the gain equalization using a gain flattening module of the type shown in FIG. 2.

Referring to FIG. 6, the gain flattening module 22 is adapted to compensate for the known variation of the gain spectrum of the gain stage 20. The gain flattening module flattens the gain or, in other words, selectively attenuates the gain spectrum so that the gain differential between each channel is preferably approximately 0.1–0.5 dB. The selective attenuation by the gain flattening module 12 may be provided by dielectric filters or fiber gratings, such as Long Period Gratings as shown in U.S. Pat. No. 5,430,817.

FIG. 6 includes a pair of curves 36,38 showing the amplified amplitude of the optical beam from gain stage 20 as a function of wavelength. The gain stage 20 of plot 36 comprises an erbium doped fluoride host glass fiber and the gain stage of curve 38 comprises an erbium doped silica host glass fiber. The attenuation of the amplified signal by the gain flattening module is graphically shown in curve 40. A solid curve 41 represents the attenuation of the input optical beam as a function of the wavelength for silica host glass fiber and a dotted curve 43 represents the attenuation of the input optical beam as a function of the wavelength for fluoride host glass fiber. The attenuation for each doped fiber is proportionally inverse to its respective gain spectrum 36,38. The resulting gain spectrum from each respective doped fiber and gain flattening module is substantially equal between each channel, as shown in curve 42.

Depending upon the spectral flatness of the passive fiber amplifier gain stage 20 (i.e. erbium doped fluoride host glass fiber), the passive gain flattening module 22 may not be required. This is true in the case where the gain equalization module 24 has sufficient bandwidth and dynamic range to provide both the gain flattening function and the gain equalization function simultaneously.

Referring again to FIG. 2, the flattened optical signal from the gain flattening module 22 then propagates to the gain equalization module 24 which substantially equalizes dynamically the amplitude of each channel 12. Dynamic gain equalization is necessary to compensate for the dynamic gain changes of the gain stage 20, such as gain tilt, gain ripple, hole burning, transient gain fluctuations, and any gain fluctuations from the gain flattening module 22. As described earlier, gain tilt is a function of the input power and spectra of the transmitted channels. As channels are added and subtracted from the optical beam, the input power and spectrum changes and effectively "tilts" the gain of the amplifier in dependence of the wavelength of the channels. To compensate for gain tilt, the gain equalization module 24 selectively attenuates each respective channel in accordance to control signals provided by the loop status monitor 28.

Figure 7:
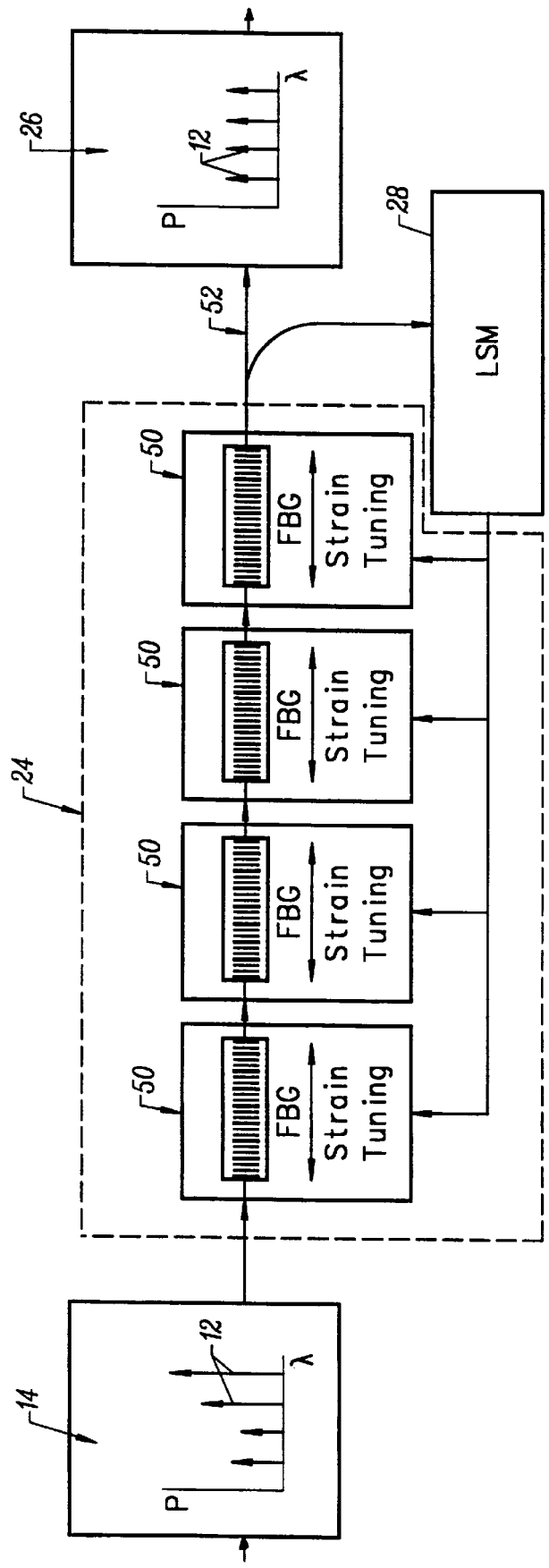
FIG. 7 is a block diagram representative of the dynamic gain equalization module of FIG. 2.

As shown in FIG. 7, the gain equalization module 24 incorporates an array of wavelength tunable fiber Bragg gratings 50 to attenuate each channel 12. Each grating 50 is nominally aligned to a channel such that the transmission through the grating is varied by tuning the Bragg wavelength of the grating. The loop status monitor 28 measures the amplitude or power of each channel and provides a control signal back to each respective tunable grating 50 of the gain equalization module 24. Each grating 50 then attenuates each channel 12 in response to the corresponding control signal to vary the amplitude of each transmission through the grating, so that the amplitude of each channel is substantially equal at the amplifier's output terminal 52. One skilled in the art would recognize that other methods of tuning, such as electro-optic and acousto-optic tunable filters (AOTF), may be used to selectively attenuate the channels of the optical signal. A preferred gain equalization module 24 is described in greater detail in Applicants' co-pending application for "Dynamic Gain Equalization Module", attorney docket no. 4827-11, which is incorporated herein by reference.

Figure 8:
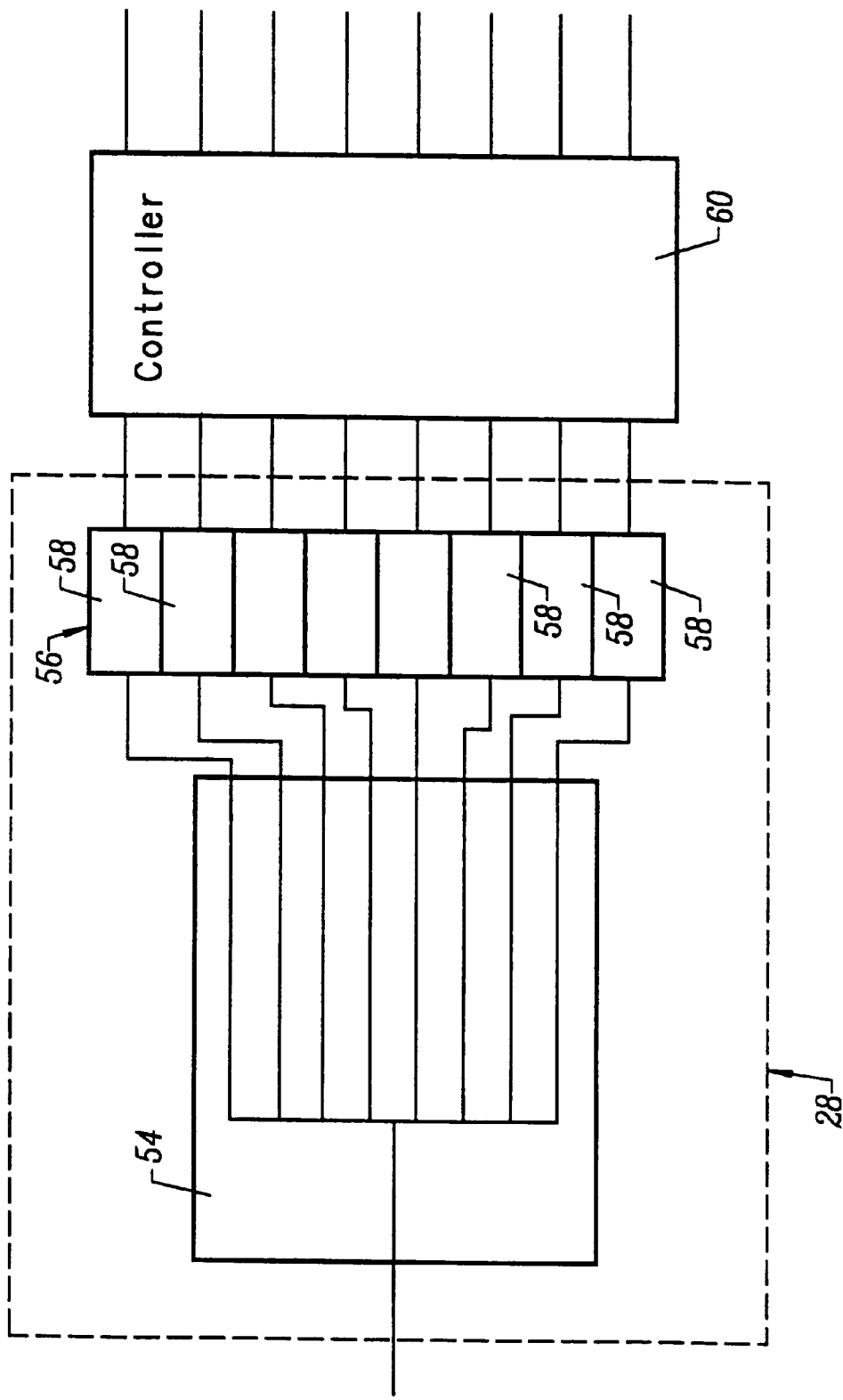
FIG. 8 is a block diagram representative of the Loop Status Monitor of FIG. 2.

Referring to FIG. 8, the loop status monitor 28 includes a dense wavelength division demultiplexing arrayed waveguide 54 and a detector array 56 for providing a corresponding control signal to each of the tunable gratings 50 of the gain equalization module 24 (See FIG. 7). The loop status monitor serves the function of a low cost optical spectrum analyzer.

The planar array waveguides are currently made using silica on silicon technology. These are silica on silicon waveguides and are commercially available for multiplexing/demultiplexing in WDM networks. The planar waveguides include a plurality of precision ion implanted regions for separating each channel of the optical beam and directs them to a corresponding detector element 58 of the detector array 56. In an alternative, any passive multiplexing/demultiplexing dielectric filter based device or Fiber Bragg Grating based device could be used with appropriate modifications.

WDM 1×N arrayed demultiplexer waveguides are presently commercially available. These commercial waveguides include multiple fiber pigtail outputs that result in relatively high excess losses (approximately 7 dB). In contrast, the waveguide embodied in the present invention is butt-coupled to each of the elements 58 of the detector array, and thus eliminates the output pigtails and reduces the associated insertion loss.

The detector elements 58 generates concurrently an output signal for each channel 12 that is representative of the amplitude of each channel. The output signals of each detector element 58 are provided to a controller 60. In response to these output signals, the controller 60 generates corresponding control signals representative of the degree of attenuation required to equalize the output signal of each channel of the amplifier 10. Each respective control signal is indicative of the difference between the amplitude of the respective channel and the channel having the least amplitude.

One benefit of the loop status monitor 28 is that it provides greater than 15 dB of channel isolation without additional filtering. If there is excessive cross-talk between the channels, Bragg gratings may be written directly into the silica of the waveguide to increase the channel isolation and enhance the resolution in the monitor 28. Increased channel isolation also permits blocking of the WDM signals by tuning the grating, such as by heating, which permits detection of the amplifier noise level. This information allows the signal-to-noise ratio to be computed.

Another benefit of the loop status monitor 28 is the parallel monitoring of the channels 12 of the optical signal. One skilled in the art would also appreciate that the output of the loop status monitor may also be used to monitor the "health" and status, such as channel power and channel signal-to-noise ratio, at various locations within the network.

Alternatively, an AOTF, configured as a spectrum analyzer along with appropriate control and feedback electronics can be used as a loop status monitor 28. In this embodiment, the AOTF scans through each network channel 12, sequentially, monitoring the power in each channel. The selection of wavelengths can be changed in approximately 10 microseconds making the spectrum analyzer reconfiguration virtually instantaneous. From this data a channel intensity profile can be constructed and fed to appropriate network elements including the gain equalization module 24, programmable add-drop modules and network health monitoring systems. The use of an AOTF as a loop status monitor 28 is described in greater detail in Applicants' co-pending application for "Loop Status Monitor For Determining The Amplitude Of The Signal Components Of A Multi-Wavelength Optical Beam", attorney docket no. 4827-13, which is incorporated herein by reference.

In an alternative embodiment of FIG. 2, a second gain stage 30 may be inserted in series after the gain equalization module 24. The second gain stage 30 is similar to the above-described gain stage 20 that includes a doped optical fiber of a rare earth ion, such as erbium and praseodymium. The nonuniform gain spectrum of the second gain stage 30 is corrected by the gain equalization module 24 in response to the control signals of the loop status monitor 28.

Figure 9:
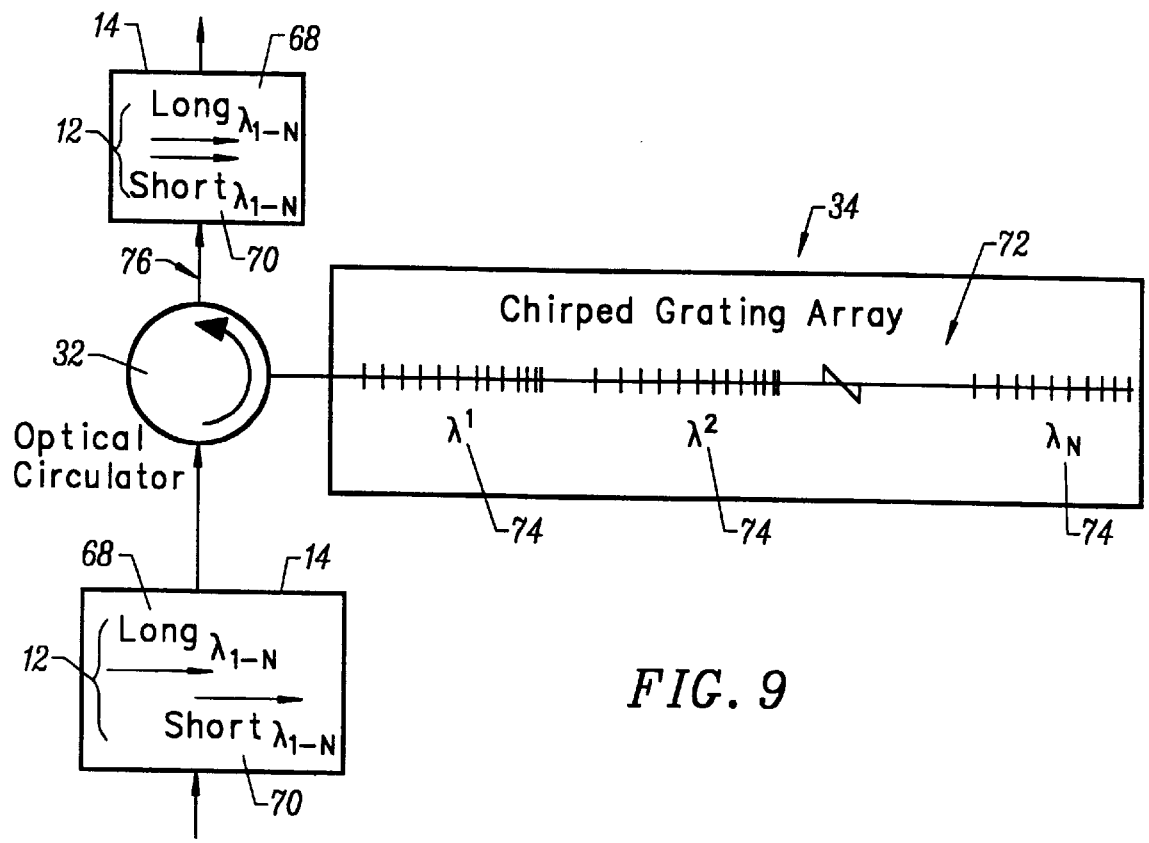
FIG. 9 is illustrative of the circulator and dispersion compensation of FIG. 2.
Figure 10:
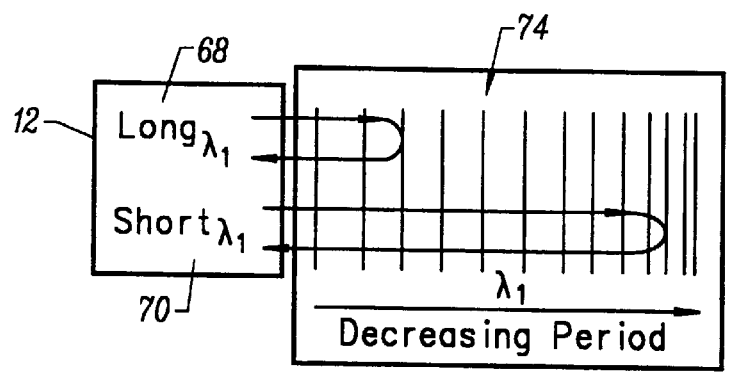
FIG. 10 is illustrative of the phenomenon of dispersion and the method of compensation of the dispersion.

In addition, a circulator 32 and dispersion compensator 34 may be connected in series before the loop status monitor 28 as shown in FIG. 10. Each channel 12 is composed a spectrum of a plurality of optical wavelengths 68,70 that are represented graphically in FIGS. 9 and 10 as a long wavelength 68 and a short wavelength 70. Dispersion is a result of a channel 12 "chirping" which causes the wavelengths 68,70 of a channel to pass through the optical fiber at different rates resulting in a temporal smearing of the signal. Dispersion limits the practical link length in 10 Gbit/second transmission systems and is defined as a temporal broadening of a channel usually most clearly seen at the transition of the signal between a high and low state.

As shown in FIG. 9, the circulator 32 receives the input optical beam 67 and directs it to the dispersion compensator 34. The dispersion compensator 34 includes a chirped grating array 72 fabricated in a known manner for selectively delaying the transmission of the wavelengths 68, 70 of the spectrum of each channel 12, and thereby reduce the temporal broadening or smearing caused by dispersion. Each channel propagates through each respective chirped grating 74 to compensate for dispersion of each respective channel. The optical circulator 32 then receives the optical beam 14 reflected back from the dispersion compensator 34 and directs the beam to the output 76 of the circulator.

The operation of the dispersion compensator 34 is schematically shown in FIG. 11. The optical wavelengths 68, 70 that comprise the channel 12 propagate through that channel's respective chirped grating 74, wherein the long wavelength 68 lags the short wavelength 70 by an amount at the input of the grating 74. The grating 74 then reflects each wavelength 68, 70 of the channel back to the circulator 32 to compensate for the effects of dispersion. For example, the propagation time through the chirped grating for the short wavelength 70 is less than that of the long wavelength 68 by a predetermined amount. Consequently, the temporal smearing is removed, and the optical signal of channel 12 thereafter more closely resembles the signal originally presented to the optical network.

In an alternative embodiment for compensating for dispersion, a dispersion compensating fiber that is commercially available may be used.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, other combinations of the composition of fibers and rare earth ions may be used to amplify an optical beam.

Having thus discribed my invention, what is claimed is:

1. An optical amplifier for amplifying substantially equally a plurality of component signals of a multi-wavelength optical beam transiting an optical network in which each component signal has an amplitude and a unique wavelength; the amplifier comprising:

amplifying means for generating amplified component signals, the amplitude of each amplified component signal being respectively increased by a selected value;

gain flattening means for selectively attenuating said amplified component signals according to a fixed attenuation versus wavelength characteristic to generate gain flattened component signals; and equalization means for receiving said gain flattened component signals and for generating therefrom equalized component signals from said gain flattened component signals, said equalized component signals having respective amplitude which are adjusted to remove any relative amplitude difference therebetween due to variations in the amplitudes of said component signals of the multi-wavelength optical beam, said equalization means including at least one wavelength tunable filter for selectively filtering at least one of said gain flattened component signals responsive to a wavelength tuning control signal.

2. An optical amplifier, as set forth in claim 1, further comprises feedback means for determining the amplitude of each of said component signals and generating a feedback signal indicative thereof for each respective component signal.

3. An optical amplifier, as set forth in claim 2, wherein the feedback means comprises:

demultiplexing means for separating each component signal from the multi-wavelength optical beam; and detector means for providing the feedback signal representative of the amplitude of each respective component signal.

4. An optical amplifier, as set forth in claim 3, wherein the feedback means further comprises a controller for generating the control signal representative of the adjustment required to substantially equalize the amplitudes of said equalized component signals.

5. An optical amplifier, as set forth in claim 1, wherein the amplifying means comprises an optical fiber having a dopant.

6. An optical amplifier, as set forth in claim 5, wherein the dopant is erbium.

7. An optical amplifier, as set forth in claim 5, wherein the dopant is praseodymium.

8. An optical amplifier, as set forth in claim 1, wherein the flattening means comprises a plurality of gain filters for attenuating each respective component signal a select amount.

9. An optical amplifier, as set forth in claim 8, wherein each gain filter includes Long Period Gratings.

10. An optical amplifier, as set forth in claim 1, further comprising an optical isolator provided at an input of the amplifier for preventing reflection back to the optical network.

11. An optical amplifier, as set forth in claim 1, further includes a second amplifying means provided after the equalization means, the second amplifying means for increasing the amplitude of each component signal of the multi-wavelength optical beam.

12. An optical amplifier, as set forth in claim 10, wherein a second amplifying means for amplifying the channels of the optical signals includes an optical fiber doped with a rare earth ion.

13. An optical amplifier, as set forth in claim 1, further includes a means for compensating for dispersion of the component signals of the multi-wavelength optical beam.

14. An optical amplifier, as set forth in claim 1, wherein the means for compensating for dispersion comprises a grating array for delaying the propagation of each component signal a predetermine time period and an optical circulator for directing each component signal to and from the grating array.

15. A method for amplifying substantially equally a plurality of component signals of a multi-wavelength optical beam transiting an optical network in which each component signal has an amplitude and a unique wavelength; said method comprising the steps of:

(a) amplifying the amplitude of each component signal by a respective amount;

(b) attenuating the component signals according to a fixed attenuation versus wavelength characteristic, and (c) adjusting, in response to control signals, the amplitude of each component signal to compensate for the varying, nonuniform gain of the amplifying means such that any relative amplitude difference therebetween is removed, the step of adjusting including wavelength-tuning at least one filter to selectively adjust the amplitude of at least one component signal.

16. A method, as set forth in claim 15, further comprises the steps of:

(a) demultiplexing the multi-wavelength optical beam into each respective component signal;

(b) generating a feedback signal for each respective component signal.

(c) determining the amplitude of each component signal (d) comparing the amplitudes of each component signal; and (e) generating each respective control signal in dependence to the differences between the amplitudes of the component signals.

17. A method, as set forth in claim 15, further comprises, after step (c), the step of:

(d) compensating for dispersion of the component signals of the multi-wavelength optical signal.

* * * * *